(12) United States Patent
Kroon et al.

(10) Patent No.: US 9,451,243 B2
(45) Date of Patent: Sep. 20, 2016

(54) AUTOSTEREOSCOPIC DISPLAY DEVICE

(71) Applicant: KONINKLIJKE PHILIPS N.V., Eindhoven (NL)

(72) Inventors: Bart Kroon, Eindhoven (NL); Eibert Gerjan Van Putten, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/772,220

(22) PCT Filed: Mar. 19, 2014

(86) PCT No.: PCT/EP2014/055461
§ 371 (c)(1),
(2) Date: Sep. 2, 2015

(87) PCT Pub. No.: WO2014/147100
PCT Pub. Date: Sep. 25, 2014

(65) Prior Publication Data
US 2016/0014398 A1    Jan. 14, 2016

(30) Foreign Application Priority Data

Mar. 22, 2013 (EP) .................................... 13160530

(51) Int. Cl.
*H04N 13/04* (2006.01)
*G02B 27/22* (2006.01)
*G09G 3/36* (2006.01)

(52) U.S. Cl.
CPC ........ *H04N 13/0404* (2013.01); *G02B 27/225* (2013.01); *G09G 3/3607* (2013.01); *G09G 3/3648* (2013.01); *H04N 13/0415* (2013.01); *H04N 13/0422* (2013.01); *H04N 13/0497* (2013.01); *G09G 2320/0233* (2013.01)

(58) Field of Classification Search
CPC .................................................. H04N 13/0404
USPC ............................................................ 348/59
See application file for complete search history.

(56) References Cited

U.S. PATENT DOCUMENTS

| | | | | |
|---|---|---|---|---|
| 6,069,650 A | * | 5/2000 | Battersby | G02B 27/2214 345/6 |
| 2008/0204550 A1 | * | 8/2008 | De Zwart | H04N 13/0404 348/51 |
| 2011/0248994 A1 | * | 10/2011 | Van Der Horst | H04N 13/0404 345/419 |

FOREIGN PATENT DOCUMENTS

| | | |
|---|---|---|
| WO | 2006117707 A2 | 11/2006 |
| WO | 2010070564 A1 | 6/2010 |

OTHER PUBLICATIONS

Wilemsen, O.H. et al "Fractional Viewing Systems to Reduce Banding in Lenticular Based 3D Displays", Proc. Int. Disp. Workshops, vol. 12, 2005, pp. 1789-1792.

* cited by examiner

*Primary Examiner* — Christopher S Kelley
*Assistant Examiner* — Jonathan Messmore

(57) ABSTRACT

Autostereoscopic display device (1) comprising rows and columns of colour sub-pixels and a lenticular array (9) in registration with the display, the lenses of which being slanted with respect to the general column pixel direction in order to enable square, or near-square, 3D pixels.

11 Claims, 5 Drawing Sheets

(2D)　　　　　　　　　(3D)

AUTOSTEREOSCOPIC DISPLAY DEVICE

CROSS-REFERENCE TO PRIOR APPLICATIONS

This application is the U.S. National Phase application under 35 U.S.C. §371 of International Application No. PCT/EP2014/055461, filed on Mar. 19, 2014, which claims the benefit of European Patent Application No. 13160530.5, filed on Mar. 22, 2013. These applications are hereby incorporated by reference herein.

FIELD OF THE INVENTION

This invention relates to an autostereoscopic display device which comprises a display panel having an array of display pixels, and an arrangement for directing different views to different physical locations.

BACKGROUND OF THE INVENTION

A known autostereoscopic display device comprises a two dimensional emissive liquid crystal display panel having a row and column array of display pixels acting as an image forming means to produce a display. An array of elongate lenses extending parallel to one another overlies the display pixel array and acts as a view forming means. These are known as "lenticular lenses". Outputs from the display pixels are projected through these lenticular lenses, which function to modify the directions of the outputs.

The lenticular lenses are provided as a sheet of lens elements, each of which comprises an elongate semi-cylindrical lens element. The lenticular lenses extend in the column direction of the display panel, with each lenticular lens overlying a respective group of two or more adjacent columns of display pixels.

Each lenticular lens can be associated with two columns of display pixels to enable a user to observe a single stereoscopic image. Instead, each lenticular lens can be associated with a group of three or more adjacent display pixels in the row direction. Corresponding columns of display pixels in each group are arranged appropriately to provide a vertical slice from a respective two dimensional sub-image. As a user's head is moved from left to right a series of successive, different, stereoscopic views are observed creating, for example, a look-around impression.

The above described autostereoscopic display device produces a display having good levels of brightness. However, one problem associated with the device is that the views projected by the lenticular sheet are separated by dark zones caused by "imaging" of the non-emitting black matrix which typically defines the display pixel array. These dark zones are readily observed by a user as brightness non-uniformities in the form of dark vertical bands spaced across the display. The bands move across the display as the user moves from left to right and the pitch of the bands changes as the user moves towards or away from the display. Another problem is that the vertical lens result in a much greater reduction in resolution in the horizontal direction than in the vertical direction.

Both of these issues can be at least partly addressed by the well-known technique of slanting the lenticular lenses at an acute angle relative to the column direction of the display pixel array. The use of slanted angles lenses is thus recognised as an essential feature to produce different views with near constant brightness, and a good RGB distribution behind the lenses.

Traditionally, display panels are based on a matrix of pixels that are square in shape. In order to generate images in colour, the pixels are divided into sub-pixels. Traditionally, each pixel is divided into 3 sub-pixels, transmitting or emitting red (R), green (G) and blue (B) light, respectively. Sub-pixels of equal colour are typically arranged in columns.

WO2010/070564 discloses an arrangement in which the lens pitch and lens slant are selected in such a way as to provide an improved pixel layout in the views created by the lenticular array, in terms of spacing of colour sub-pixels, and uniformity of colour density. This case relates to the arrangement of the grid of pixels forming the 3D image, rather than the individual pixels.

The invention concerns the shape of the individual pixels forming the 3D image.

WO 2010/070564 discloses an autostereoscopic display with slanted lenticular lenses wherein a particular lens pitch is selected to achieve a uniform and regular distribution of 3D pixels.

SUMMARY OF THE INVENTION

The invention is defined by the claims.

According to a first aspect of the invention, there is provided an autostereoscopic display device comprising:

a display having an array of display pixels for producing a display, wherein the display pixels are arranged in rows and columns of different colour sub-pixels;

a lens array arranged in registration with the display for projecting a plurality of views towards a user in different directions, and comprising elongate lenses configurable to focus outputs of groups of the display pixels into the plurality of views projected towards a user in different directions, thereby enabling autostereoscopic imaging, wherein the elongate lenses have a long axis which is slanted at an angle θ to the general column pixel direction, wherein:

$$s = \pm\left(\frac{\alpha p}{2c} - \sqrt{\left(\frac{\alpha p}{2c}\right)^2 + 1}\right)$$

where s=tan θ, α is the aspect ratio of the pixels forming each of the plurality of views, p is the pitch of the lenses across the pixel row direction, expressed as a number of display sub-pixel widths, and c is the number of different colour sub-pixels forming each pixel of the display, and wherein $$0.8 \leq \alpha \leq \frac{1}{0.8}.$$

The invention thus relates to a design to enable square or near square 3D pixels (which themselves comprise a set of 3D sub-pixels). This is achieved by the value α being close to 1. For such displays, the slant angle is made to be a particular function of the pitch.

The invention provides a design space in which the 3D pixels can be designed to have an equal aspect ratio resolution as the underlying display panel. The design space offers good designs for high resolution panels such as Super Hi-Vision (SHV) displays. The 3D views will always have a lower spatial resolution than the underlying panel. The desired reduction factor in resolution, A, can be used to calculate the required pitch:

$$p = \frac{cA}{\sqrt{\alpha A - 1}}$$

Thus, the combination of lens pitch and slant angle take account of the reduction in resolution, the number of colour sub-pixels of the 2D display and the desired aspect ratio of the 3D pixels to be formed by the lens arrangement. The reduction factor represents the number of native 2D pixels there are per 3D pixel. Thus, the reduction factor is greater than 1.

Each pixel of the display can comprise a striped RGB pixel with red green and blue sub-pixels each extending in the column direction and arranged side by side. Alternatively, each pixel of the display comprises a striped RGBY pixel with red green blue and yellow sub-pixels each extending in the column direction and arranged side by side. Other pixel configurations can also be used.

In one example c=3 and A=9. This is of particular interest for a Super Hi-Vision RGB panel of 7680×4320 RGB pixels, with Quad HD 3D resolution of 2560×1440 3D RGB pixels.

In another example c=4 and A=16. This is of particular interest for a Super Hi-Vision RGBY panel of 7680×4320 RGBY pixels, with Quad HD 3D resolution of 1920×1080 3D RGBY pixels.

In other arrangements, c=3 and A=16 or c=4 and A=9.

The invention also provides a method of determining the slant angle for an elongate lens array of an autostereoscopic display device, wherein the device comprises a display having an array of display pixels for producing a display, wherein the display pixels are arranged in rows and columns of different colour sub-pixels and a lens array arranged in registration with the display for projecting a plurality of views towards a user in different directions, and comprising elongate lenses configurable to focus outputs of groups of the display pixels into the plurality of views projected towards a user in different directions, thereby enabling autostereoscopic imaging, wherein the elongate lenses have a long axis which is slanted at an angle θ to the general column pixel direction, wherein the method comprises setting:

$$s = \pm \left( \frac{\alpha p}{2c} - \sqrt{\left(\frac{\alpha p}{2c}\right)^2 - 1} \right)$$

where s=tan θ, α is the aspect ratio of the pixels forming each of the plurality of views), p is the pitch of the lenticular lenses across the pixel row direction, expressed as a number of display sub-pixel widths, and c is the number of different colour sub-pixels forming each pixel of the display, and setting:

$$0.8 \leq \alpha \leq \frac{1}{0.8}.$$

The method also comprises setting:

$$p = \frac{cA}{\sqrt{\alpha A - 1}}$$

wherein A is the reduction factor of spatial resolution of the 3D views compared to the underlying panel.

BRIEF DESCRIPTION OF THE DRAWINGS

Embodiments of the invention will now be described, purely by way of example, with reference to the accompanying drawings, in which.

DETAILED DESCRIPTION OF THE EMBODIMENTS

The invention provides a lenticular autostereoscopic display device with a particular design of lenticular array (slant angle and preferably also lens pitch) to optimise the quality of the views provided to the user. In particular, the invention enables pitch and slant angles to be optimised to achieve 3D pixels with a similar aspect ratio as the underlying pixels. In practise this usually means that the invention leads to square or near square 3D pixels.

Before describing the invention in detail, the configuration of a known autostereoscopic display will first be described.

Figure 1:
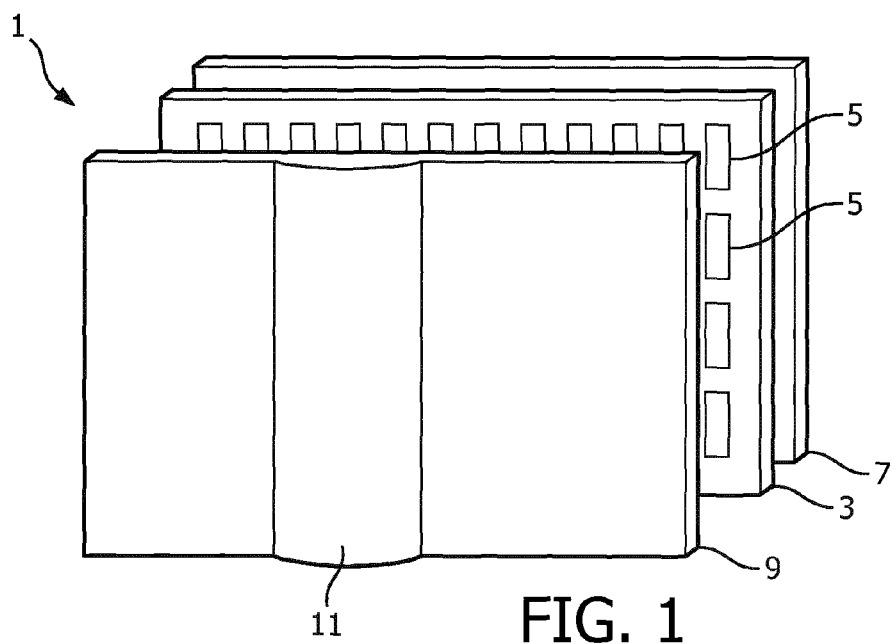
FIG. 1 is a schematic perspective view of a known autostereoscopic display device.

FIG. 1 is a schematic perspective view of a known multi-view autostereoscopic display device 1. The known device 1 comprises a liquid crystal display panel 3 of the active matrix type that acts as an image forming means to produce the display.

The display panel 3 has an orthogonal array of display pixels 5 arranged in rows and columns. For the sake of clarity, only a small number of display pixels 5 are shown in FIG. 1. In practice, the display panel 3 might comprise about one thousand rows and several thousand columns of display pixels 5.

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarising layers are also provided on the outer surfaces of the substrates.

Each display pixel 5 comprises opposing electrodes on the substrates, with the intervening liquid crystal material therebetween. The shape and layout of the display pixels 5 are determined by the shape and layout of the electrodes and a black matrix arrangement provided on the front of the panel 3. The display pixels 5 are regularly spaced from one another by gaps.

Each display pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises a lenticular sheet 9, arranged over the display side of the display panel 3, which performs a view forming function. The lenticular sheet 9 comprises a row of lenticular lenses 11 extending parallel to one another, of which only one is shown with exaggerated dimensions for the sake of clarity. The lenticular lenses 11 act as view forming elements to perform a view forming function.

The lenticular lenses 11 are in the form of convex cylindrical elements, and they act as a light output directing means to provide different images, or views, from the display panel 3 to the eyes of a user positioned in front of the display device 1.

The autostereoscopic display device 1 shown in FIG. 1 is capable of providing several different perspective views in different directions. In particular, each lenticular lens 11 overlies a small group of display pixels 5 in each row. The lenticular element 11 projects each display pixel 5 of a group in a different direction, so as to form the several different views. As the user's head moves from left to right, his/her eyes will receive different ones of the several views, in turn.

Figure 2:
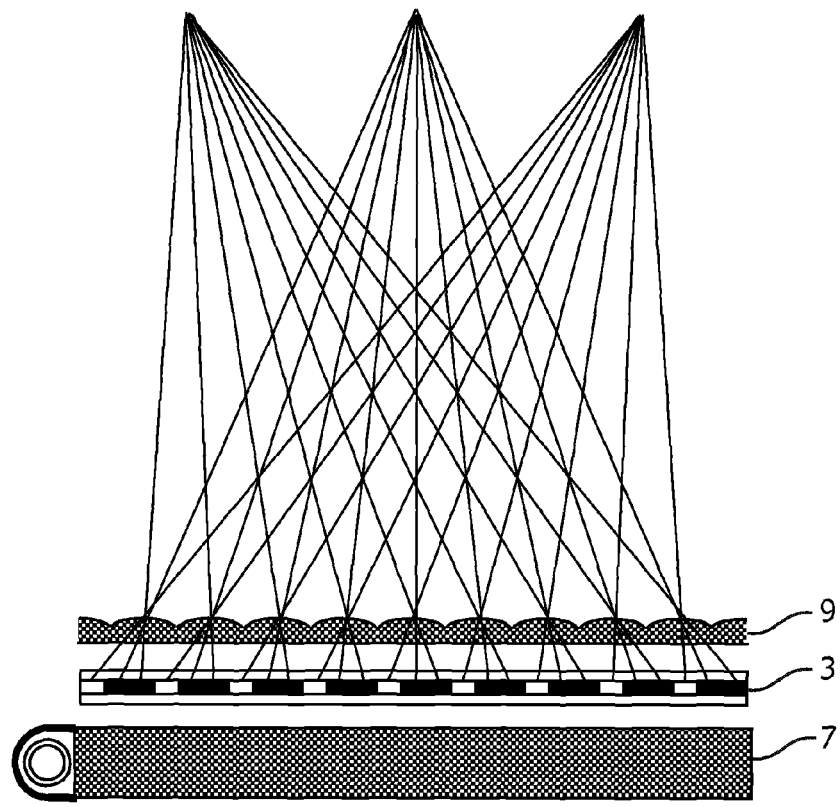
FIG. 2 is a schematic cross sectional view of the display device shown in FIG. 1.

FIG. 2 shows the principle of operation of a lenticular type imaging arrangement as described above and shows the light source 7, display panel 3 and the lenticular sheet 9. The arrangement provides three views each projected in different directions. Each pixel of the display panel 3 is driven with information for one specific view.

The above described autostereoscopic display device produces a display having good levels of brightness. It is well known to slant the lenticular lenses at an acute angle relative to the column direction of the display pixel array. This enables an improved brightness uniformity and also brings the horizontal and vertical resolutions closer together.

Figure 3:
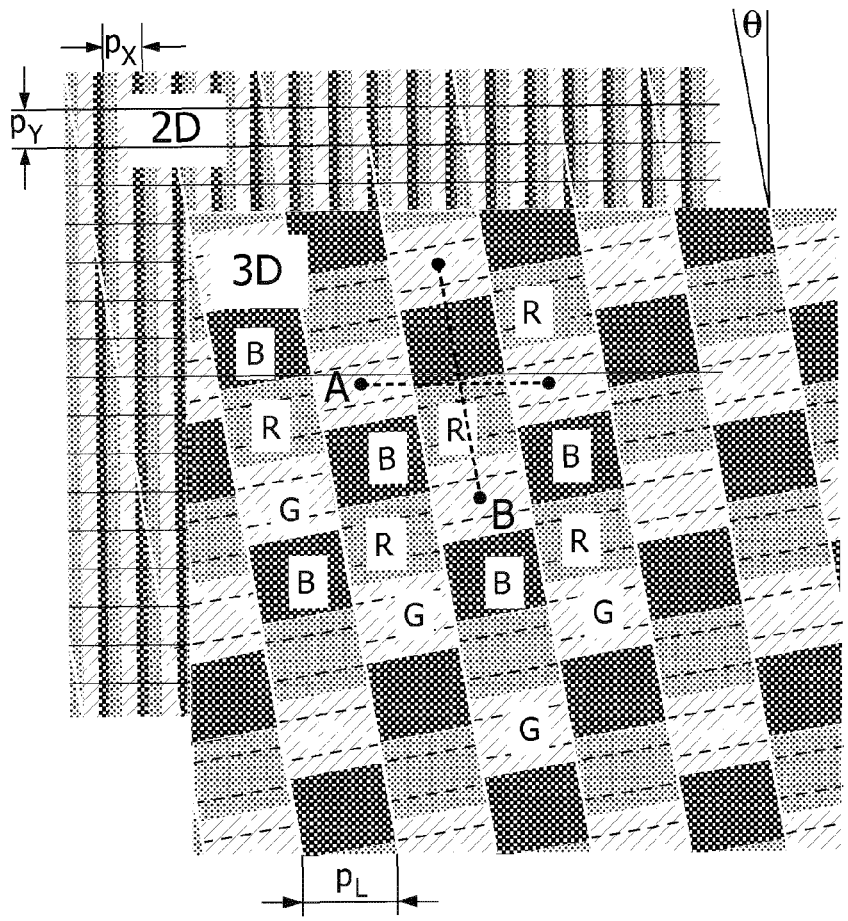
FIG. 3 shows how the known RGB pixel is projected by the lenticular arrangement in a known display.

Whatever the mechanism used to obtain an auto-stereoscopic display system, resolution is traded for depth: the more views, the higher the loss in resolution per view. This is illustrated in FIG. 3, which shows the native pixel layout of the 2D display panel as well as, on the same scale, the pixel layout in a 3D view obtained by putting a lenticular in front of the panel.

The pixel layout shown for the 3D image represents the pixel pattern as seen from one viewing direction. The same geometric pixel pattern is seen from all viewing directions, but different sets of sub-pixels of the underlying 2D display are visible. For a given viewing direction as shown, a blue 3D sub-pixel is an image of a one or more sub-pixels of the native 2D display (and the same applies for green and red).

The lenticular has a slant $s=\tan(\theta)=\frac{1}{6}$ and a lens pitch $P_L=2.5\ p_x$ (where $p_x$ is the pixel pitch in the row direction) resulting in 15 views. In this case, $p_x=p_y$. The lens pitch is thus 7.5 when expressed as a number of sub-pixel dimensions in the row direction. The 3D image has a repeating pattern of sub-pixels, and the colours of a few sub-pixels (R, G and B) are shown so that all colours in the pattern can be understood. Each colour is output as a diamond shaped grid of sub-pixels which are interleaved with each other.

The slant angle of the lenticular as well as its pitch should be chosen such that a number of requirements are fulfilled as much as possible:

(i) A favourable distribution of pixels should be obtained for each 3D view.

In each of the 3D views the sub-pixels of each colour should be distributed in a pattern that is regular and having a resolution that is similar for the horizontal and vertical direction. As shown in FIG. 3, the horizontal distance between neighbouring green pixels (labelled A in FIG. 3) should be comparable to the vertical distance between neighbouring green pixels (labelled B). This should hold for the other colours as well.

(ii) The surface area occupied by pixels of the same colours should be equal for each 3D view.

(iii) Absence of moiré.

The combination of a lenticular in front of a display panel is very susceptible to the occurrence of moiré ('banding'). This effect is caused by the combination of the periodicity of the pixel layout of the display panel and the periodicity of the lenticular. It is worsened by the fact that the sub-pixels of the display panel are surrounded by a black matrix. By means of slanting the lenticular and by choosing the lenticular to have a width that is not equal to an integer times the width of a sub-pixel, this moiré effect can be minimised.

Recently, display manufacturers started looking into alternative pixel layouts using more than 3 primary colours.

Figure 4:
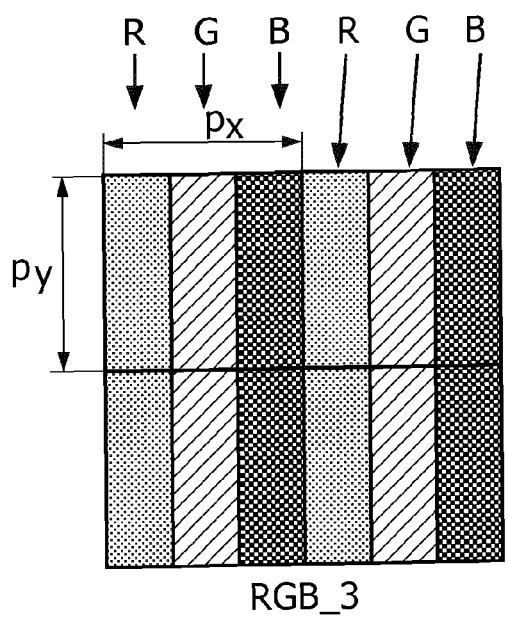
FIG. 4 shows the known RGB pixel layout and a known RGBW pixel for a display to which the invention can be applied.
Figure 5:
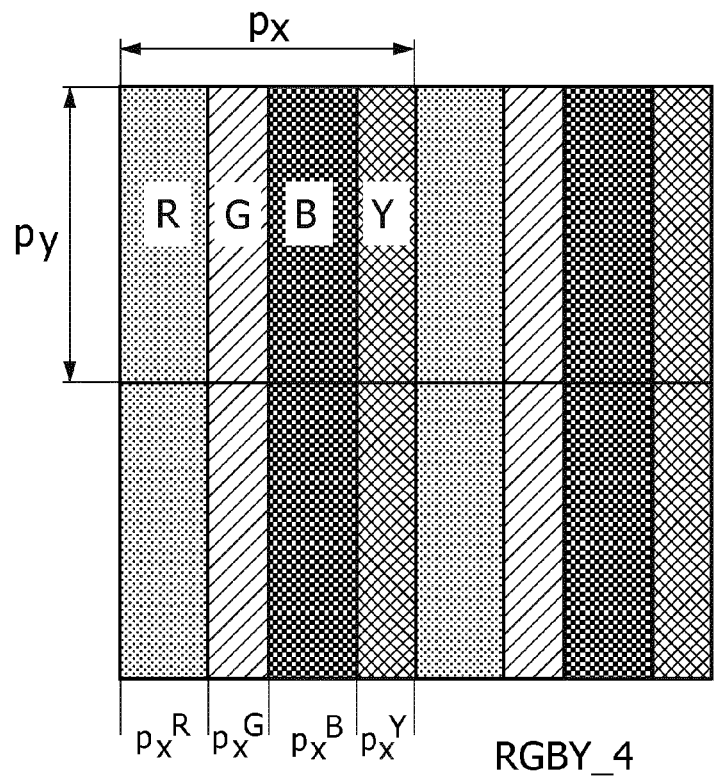
FIG. 5 shows an RGBY pixel layout for a display to which the invention can be applied.

FIGS. 4 and 5 show two pixel layouts. The subpixels are identified with letter labels ("R", "G", "B" etc.) to denote the colour. The pixels are in repeating patterns. Where columns of pixels have the same colour, these are identified from above the columns. The colours of only enough pixels have been shown for the repeating pattern to be identified.

FIG. 4 shows a conventional RGB striped pixel layout. Each pixel has three sub-pixels, hence the subscript "3" in RGB_3 (the same notation is used for all pixel layouts).

Pixel layouts using more than 3 primary colours are termed "multi-primary" pixel layouts. Several such multi-primary layouts have reached the market and are expected to become mainstream.

FIG. 5 shows an RGBY (Y=Yellow) pixel layout, which has been used by Sharp. In FIG. 5, $p_x^R=p_x^B=2\ p_x^G=2p_x^Y$ (the red and blue sub-pixels are twice as wide as the green and yellow sub-pixels in the row direction). Compared to the RGB layouts, this layout results in a larger colour gamut.

As explained above, for autostereoscopic displays, spatial resolution is usually sacrificed to create angular resolution in the form of views. Current best lens designs offer an unequal trade-off between horizontal and vertical spatial resolution, resulting in 3D views with pixels that have a different aspect ratio than that of the original pixels of the underlying panel. This usually means that the horizontal 3D pixel density is inconveniently different from the vertical 3D pixel density.

An optimal lens design must take account of the underlying display pixel layout. The most common current display resolutions are defined in the table below:

| Name | Abbreviation | Horizontal | Vertical | Color | Elements |
|---|---|---|---|---|---|
| High definition | HD | 1280 | 720 | RGB | 2.7 MP |
| Full high definition | FHD | 1920 | 1080 | RGB | 6.2 MP |
| Quad high definition | QHD | 2560 | 1440 | RGB | 11 MP |
| Quad full high definition | QFHD | 3840 | 2160 | RGB | 25 MP |
| Super Hi-Vision | SHV | 7680 | 4320 | RGB | 100 MP |

For Full HD and Quad Full HD displays, suitable design parameters for an autostereoscopic lens design have been proposed with pitch around 4½ sub-pixels and slant ⅙.

The parameters can be altered slightly to provide a so-called fractional design to reduce banding, in particular with a pitch a/b with a and b being integers and b>2. The use of fractional views is discussed in O. H. Willemsen, S. T. de Zwart and W. L. IJzerman, "*Fractional viewing systems to reduce banding in lenticular based 3D displays*". Proc. Int. Disp. Workshops, vol. 12, pp. 1789-1792, 2005.

Figure 6:
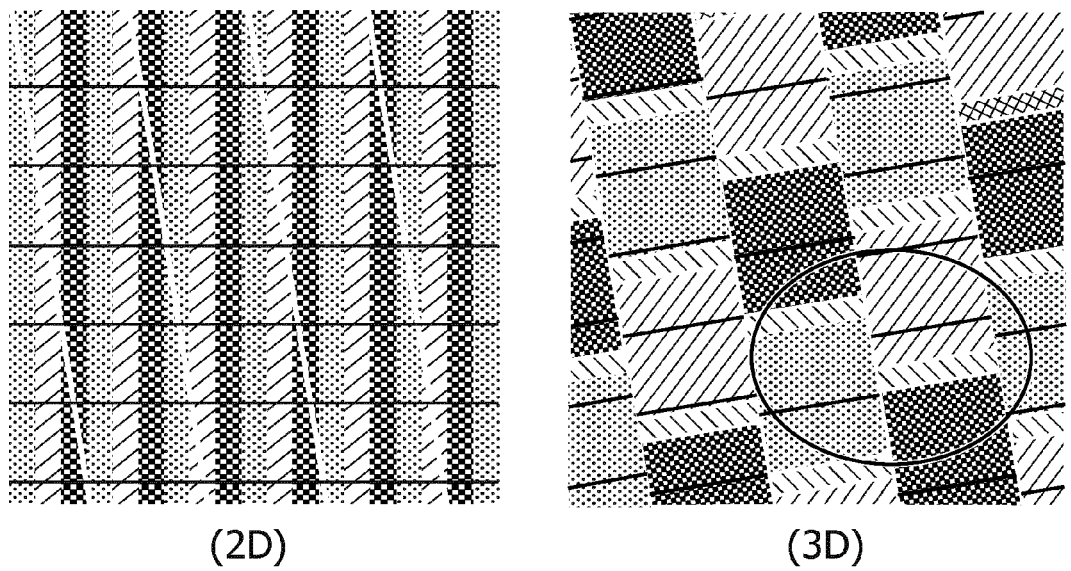
FIG. 6 shows a fractional arrangement with 4.66 subpixels per lenticular lens pitch.

FIG. 6 shows the native 2D panel with RGB stripes and the lens positions for 4⅔ sub-pixels and slant ⅙. The number of fractional views is 28 in that there are 28 possible positions of a subpixel with respect to the lens, but counting only views with little or no crosstalk in between, then 4 views is a realistic number.

Figure 7:
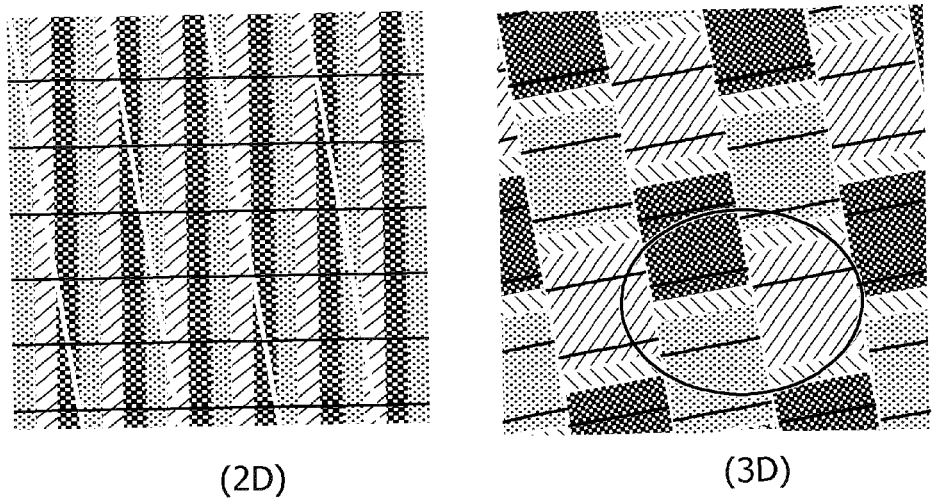
FIG. 7 shows a fractional arrangement with 4.5 subpixels per lenticular lens pitch.

FIG. 7 shows the native 2D panel with RGB stripes and the lens positions for 4½ sub-pixels.

It is difficult to estimate the spatial and angular resolution of a lenticular display as each pixel component adds both to angular and spatial resolution. As a rule of thumb, the pitch number p in sub-pixel units indicates the number of separable views (i.e. 4 or more) and the spatial resolution of a view is 1/p times of the native resolution.

By placing the lenticular lens on top of a display panel, multiple angular views can be generated. The exact shape of the sub-pixels pixels in these views depends on the parameters of the lenticular lens and the slant under which the lens is placed with respect to the underlying display panel.

Figures 8, 9:
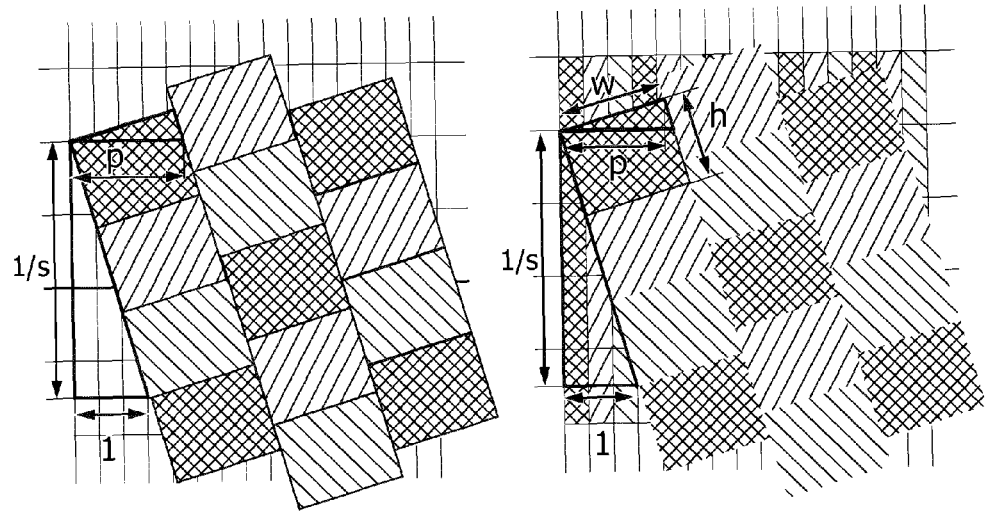
FIG. 8 shows lens pitch and slant parameters.
FIG. 9 shows how the lens pitch and slant parameters translate to dimensions of a sub-pixel of the 3D display output.

FIG. 8 shows 3D sub-pixels created by placing a lenticular lens with pitch p under slant s onto a display panel. As shown in FIG. 9, the 3D sub-pixels have width w and height h.

The important parameters in defining these 3D sub-pixel shapes are the pitch p of the lenticular lenses and the slant s. The height h of a 3D sub-pixel can be derived from FIG. 9 and is given by $$h = \left(\frac{\sqrt{1+s^2}}{s}\right)\bigg/c, \quad (1)$$

where c is the number of sub-pixels in an original 2D pixel of the display (e.g. c=3 in a RGB-striped display). The width w of the 3D sub-pixel is defined by $$w = p/c\sqrt{1+s^2}. \quad (2)$$

In a 3D view the sub-pixels are in general positioned differently than in the underlying display panel. There is the freedom how to define 3D pixels from neighboring 3D sub-pixels.

This invention provides a design space for lenticular lenses, such that the 3D pixels are square or near square and that the sacrifice in panel resolution is evenly distributed in the horizontal direction and the vertical direction, leading to a conservation of the aspect ratio in the pixels of the generated views.

Figure 10:
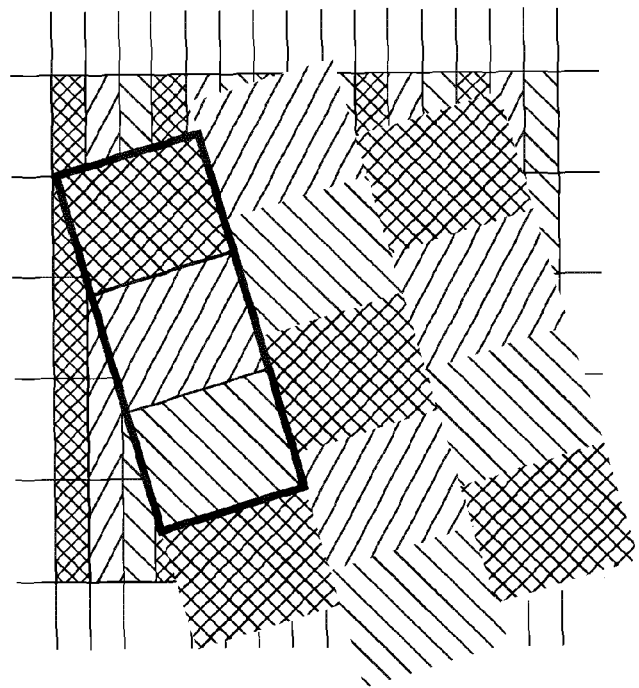
FIG. 10 shows the shape of a full 3D pixel.

To achieve this aim:
1. The 3D pixel is composed of c sub-pixels that are positioned below each other along the direction of the lenticulars. FIG. 10 shows the basic pixel layout. The parameter c is the number of sub-pixels that constitute the original pixels of the display.
2. The slant and pitch are adjusted in such a way that the full 3D pixel is sufficiently square. A method to find the correct slant and pitch is given below.

Figure 11:
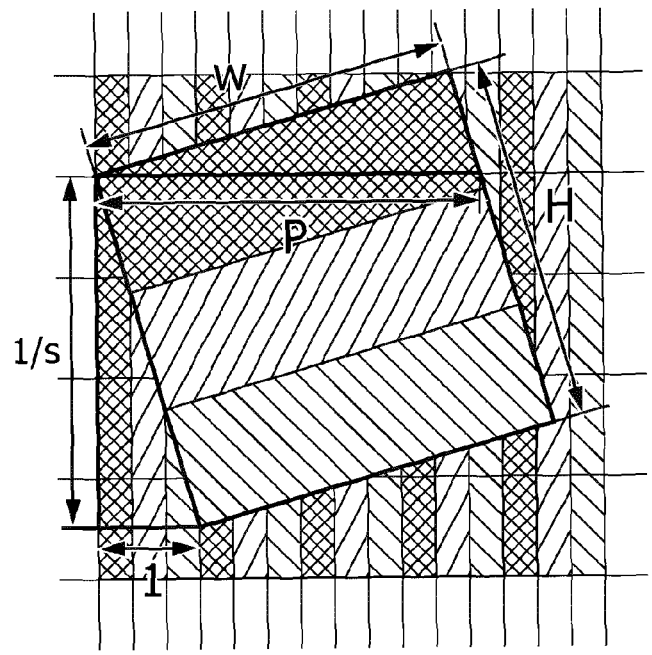
FIG. 11 shows 3D display pixel arrangement to be achieved by the design of the invention.

In this way, the 3D pixel is composed of c 3D sub-pixels, which are oriented along the direction of the lenticular lenses. Therefore the height H and the width W of the complete 3D pixel, as shown in FIG. 11, are given by:

$$H = ch = \left(\frac{\sqrt{1+s^2}}{s}\right), \quad (3)$$

This is simply c times the sub-pixel height as defined above.

$$W = w = p/c\sqrt{1+s^2}. \quad (4)$$

This is the same as the individual sub-pixel width defined above.

If it is imposed that the pixels should have an aspect ratio $\alpha$, the height should be $\alpha$ times its width. Using Eq. 3 and Eq. 4 and solving for s an expression for the slant s in terms of the pitch p and the pixel aspect ratio $\alpha$ is:

$$p = \frac{c\left[\frac{1}{s}+s\right]}{\alpha}, \quad (5)$$

so that: $\frac{1}{2}s^2 - (\alpha p/2c)s + \frac{1}{2} = 0$

Hence:

$$s = \pm\left(\frac{\alpha p}{2c} - \sqrt{\left(\frac{\alpha p}{2c}\right)^2 - 1}\right) \quad (6)$$

Equation (6) above is only one of the two solutions to the quadratic equation, in particular the one which yields sensible results for the slant s. The ± indicates that the slant can be in either sense (clockwise or counter clockwise about the column direction). The case $\alpha=1$ is when the 3D pixel is exactly to preserve the unity aspect ratio of the original panel pixels. The resulting 3D pixel with a unity aspect ratio is shown in FIG. 11.

In this way, for a given slant and 3D pixel aspect ratio, the pitch is set. However, there is still freedom to select the slant.

The invention provides a way to choose the slant based on the required reduction in spatial resolution in the 3D views.

In the layout of the invention, the 3D pixels have an aspect ratio of $\alpha$ and the 3D pixels are rotated by the slant s. If the area of a 3D pixel is A (in units of the full 2D pixel area), the reduction in resolution is also A. With this knowledge, a reduction in resolution of a factor A can be created by choosing the proper slant:

$$A = HW = \alpha W^2 = \frac{1}{\alpha}\left[\frac{1}{s^2}+1\right] \xrightarrow{yields} s = \frac{1}{\sqrt{\alpha A - 1}}. \quad (7)$$

It should be understood that in practice the 3D pixel does not have to be exactly square ($\alpha=1$), but sufficiently close to square.

Thus, preferably, $\alpha$ satisfies $$0.8 \le \alpha \le \frac{1}{0.8}.$$

For example for a given slant, Eq. 5 could give a pitch that leads to a discomforting 3D pixel layout if α=1 is used. It would then be appropriate to slightly adjust α in Eq. 5 to optimize the 3D pixel layout without disturbing the original layout too much.

From FIG. 11 it can be observed that the 3D pixel components are formed by more than one 2D pixel components. In the example shown, two components of each primary are involved.

This happens for all slants $|s|<1/c$ with c the number of components per pixel. For slants $|s|\geq 1/c$ this does not happen (so that one 2D sub-pixel maps to one 3D sub-pixel), but the bigger the slant, the wider the angular crosstalk profile.

With this motivation, in a preferred embodiment, the slant is within $$\frac{1}{\beta} \leq c|s| \leq \beta$$

with β=3/2 or more preferably with β=4/3. This places the slant angle close to 1/c so that there is an efficient use of the 2D subpixels.

The underlining principles have been outlined above. Below are some specific examples. For simplicity, the aspect ratio α=1 has been used for all these examples.

Quad Full HD RGB Panel, HD 3D Resolution

| Native resolution | | |
|---|---|---|
| Width | 3840 | px |
| Height | 2160 | px |
| Colors, c | 3 | |
| 3D resolution | | |
| Width | 1280 | px |
| Height | 720 | px |
| Colors, c | 3 | |
| Area, A | 9 | 2D px |
| Design suggestion | | |
| Slant, s | 0.354 | |
| Pitch, p | 3.182 | px |
| | 9.546 | subpx |

Super Hi-Vision RGB Panel, Full HD 3d Resolution

| Native resolution | | |
|---|---|---|
| Width | 7680 | px |
| Height | 4320 | px |
| Colors, c | 3 | |
| 3D resolution | | |
| Width | 1920 | px |
| Height | 1080 | px |
| Colors, c | 3 | |
| Area, A | 16 | 2D px |
| Design suggestion | | |
| Slant, s | 0.258 | |
| Pitch, p | 4.131 | px |
| | 12.394 | subpx |

Super Hi-Vision RGB Panel, 110% Full HD 3D Resolution

| Native resolution | | |
|---|---|---|
| Width | 7680 | px |
| Height | 4320 | px |
| Colors, c | 3 | |
| 3D resolution | | |
| Width | 2110 | px |
| Height | 1187 | px |
| Colors, c | 3 | |
| Area, A | 13.25 | 2D px |
| Design suggestion | | |
| Slant, s | 0.286 | |
| Pitch, p | 3.785 | px |
| | 11.356 | subpx |

Super Hi-Vision RGB Panel, Quad HD 3D Resolution

| Native resolution | | |
|---|---|---|
| Width | 7680 | px |
| Height | 4320 | px |
| Colors, c | 3 | |
| 3D resolution | | |
| Width | 2560 | px |
| Height | 1440 | px |
| Colors, c | 3 | |
| Area, A | 9 | 2D px |
| Design suggestion | | |
| Slant, s | 0.354 | |
| Pitch, p | 3.182 | px |
| | 9.546 | subpx |

Super Hi-Vision RGBY Panel, Full HD 3D Resolution

| Native resolution | | |
|---|---|---|
| Width | 7680 | px |
| Height | 4320 | px |
| Colors, c | 4 | |
| 3D resolution | | |
| Width | 1920 | px |
| Height | 1080 | px |
| Colors, c | 4 | |
| Area, A | 16 | |
| Design suggestion | | |
| Slant, s | 0.258 | |
| Pitch, p | 4.131 | px |
| | 16.525 | subpx |

It should be noted that the above-mentioned embodiments illustrate rather than limit the invention, and that those skilled in the art will be capable of designing many alternative embodiments without departing from the scope of the invention as defined by the appended claims.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An autostereoscopic display device comprising:
a display panel having an array of display pixels for producing a display, wherein the display pixels are arranged in rows and columns of different color sub-pixels;
a lens array arranged in registration with the display panel for projecting a plurality of views towards a user in different directions, and comprising elongate lenses configurable to focus outputs of groups of the display pixels into the plurality of views projected towards a user in different directions, thereby enabling autostereoscopic imaging, wherein the elongate lenses have a long axis which is slanted at an angle θ to the general column pixel direction,
wherein:

$$s = \pm\left(\frac{\alpha p}{2c} - \sqrt{\left(\frac{\alpha p}{2c}\right)^2 - 1}\right)$$

where s=tanθ, α is the aspect ratio of the pixels forming each of the plurality of views p is the pitch of the lenses across the pixel row direction, expressed as a number of sub-pixel widths, and c is the number of total sub-pixels forming each pixel of the display panel,
wherein:

$$0.8 \leq \alpha \leq \frac{1}{0.8},$$

and wherein:

$$p = \frac{cA}{\sqrt{\alpha A - 1}}$$

wherein A the reduction factor in resolution of the 3D view with respect to the resolution of the underlying panel.

2. The device as claimed in claim 1, wherein each pixel of the display panel comprises an RGB pixel with red green and blue sub-pixels each extending in the column direction and arranged side by side.

3. The device as claimed in claim 1, wherein each pixel of the display panel comprises an RGBY pixel with red green blue and yellow sub-pixels each extending in the column direction and arranged side by side.

4. The device as claimed in claim 1, wherein c=3 and A=9.

5. The device as claimed in claim 4, wherein the display panel has a resolution of 7680×4320 RGB pixels.

6. The device as claimed in claim 1, wherein c=4 and A=16.

7. The device as claimed in claim 6, wherein the display panel has a resolution of 7680×4320 RGBY pixels.

8. The device as claimed in claim 1, wherein c=3 and A=16.

9. The display device as claimed in claim 1, wherein the columns of pixels are parallel to a side edge of the display panel.

10. A method of determining the slant angle for a elongate lens array of an autostereoscopic display device, wherein the device comprises a display panel having an array of display pixels for producing a display, wherein the display pixels are arranged in rows and columns of different color sub-pixels and a lens array arranged in registration with the display panel for projecting a plurality of views towards a user in different directions, and comprising elongate lenses configurable to focus outputs of groups of the display pixels into the plurality of views projected towards a user in different directions, thereby enabling autostereoscopic imaging, wherein the elongate lenses have a long axis which is slanted at an angle θ to the general column pixel direction,
wherein the method comprises setting:

$$s = \pm\left(\frac{\alpha p}{2c} - \sqrt{\left(\frac{\alpha p}{2c}\right)^2 - 1}\right)$$

where s=tanθ, α is the aspect ratio of the pixels forming each of the plurality of views, p is the pitch of the lenses across the pixel row direction, expressed as a number of sub-pixel widths, and c is the number of total sub-pixels forming each pixel of the display panel,
wherein the method comprises setting:

$$0.8 \leq \alpha \leq \frac{1}{0.8}$$

and setting:

$$p = \frac{cA}{\sqrt{\alpha A - 1}}$$

wherein A is the reduction factor in resolution of the 3D view with respect to the resolution of the underlying panel.

11. The device as claimed in claim 1, wherein c=4 and A=9.

* * * * *